United States Patent
Mehta et al.

(10) Patent No.: US 9,025,471 B2
(45) Date of Patent: *May 5, 2015

(54) ANTENNA SELECTION WITH FREQUENCY-HOPPED SOUNDING REFERENCE SIGNALS

(75) Inventors: Neelesh B. Mehta, Secunderabad (IN); Koon Hoo Teo, Lexington, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1207 days.

This patent is subject to a terminal disclaimer.

(21) Appl. No.: 12/415,578

(22) Filed: Mar. 31, 2009

(65) Prior Publication Data

US 2009/0279447 A1    Nov. 12, 2009

Related U.S. Application Data

(60) Provisional application No. 61/051,216, filed on May 7, 2008, provisional application No. 61/075,102, filed on Jun. 24, 2008, provisional application No. 61/076,743, filed on Jun. 30, 2008, provisional application No. 61/077,301, filed on Jul. 1, 2008, provisional application No. 61/077,723, filed on Jul. 2, 2008.

(51) Int. Cl.
| | |
|---|---|
| *H04B 1/00* | (2006.01) |
| *H04B 1/713* | (2011.01) |
| *H04B 7/06* | (2006.01) |
| *H04B 1/38* | (2006.01) |

(52) U.S. Cl.
CPC ............... *H04B 1/713* (2013.01); *H04B 7/061* (2013.01); *H04B 1/38* (2013.01)

(58) Field of Classification Search
USPC ......... 370/203–208, 229, 230, 241, 249, 250, 370/254, 255, 339; 375/132–137
See application file for complete search history.

(56) References Cited

U.S. PATENT DOCUMENTS

| | | | | |
|---|---|---|---|---|
| 7,142,582 | B2 * | 11/2006 | Schilling | 375/134 |
| 8,331,297 | B2 * | 12/2012 | Teo et al. | 370/329 |
| 8,483,186 | B2 * | 7/2013 | Teo et al. | 370/334 |

(Continued)

OTHER PUBLICATIONS

Mitsubishi Electric: "Antenna Selection with a Frequency-Hopped or Variable Bandwidth Sounding Reference Signal" 3GPP Draft; R1-073357, 3rd Generation Partnership Project (3GPP), Mobile Competence Centre; 650, Route Des Lucioles,; F-06921 Sophia-Antipolis Cedex; France, vol. RAN WG1, No. Athens, Greece; 20070820, Aug. 14, 2007, pp. 1-3.

(Continued)

*Primary Examiner* — Yemane Mesfin
*Assistant Examiner* — Mon Cheri Davenport
(74) *Attorney, Agent, or Firm* — Dirk Brinkman; Gene Vinokur

(57) ABSTRACT

The embodiments of the invention describe a method for antenna selection in a wireless communication network. The network includes a transceiver having a set of antennas. The transceiver is configured to transmit a frequency-hopped sounding reference signal (SRS) over a subband from a subset of antennas at a time. The transceiver transmits the frequency-hopped SRS from subsets of antennas in the set of antennas alternately. In response to the transmitting, the transceiver receives information indicative of an optimal subset of antennas and transmits data from the optimal subset of antennas.

13 Claims, 9 Drawing Sheets

(56) References Cited

U.S. PATENT DOCUMENTS

| | | | |
|---|---|---|---|
| 2002/0102950 A1* | 8/2002 | Gore et al. | 455/101 |
| 2003/0083016 A1* | 5/2003 | Evans et al. | 455/67.1 |
| 2005/0085197 A1* | 4/2005 | Laroia et al. | 455/101 |
| 2008/0051149 A1* | 2/2008 | Mehta et al. | 455/562.1 |
| 2009/0011767 A1* | 1/2009 | Malladi et al. | 455/450 |
| 2009/0238241 A1* | 9/2009 | Hooli et al. | 375/133 |
| 2009/0278742 A1* | 11/2009 | Mehta et al. | 342/374 |
| 2009/0290563 A1* | 11/2009 | Gu et al. | 370/338 |
| 2010/0002649 A1* | 1/2010 | Teo et al. | 370/330 |
| 2010/0002657 A1* | 1/2010 | Teo et al. | 370/336 |

OTHER PUBLICATIONS

LG Electronics: "Considerations on Sounding Reference Signal for Closed-Loop Antenna Switching in E-UTRA Uplink" 3GPP Draft; R1-072340, $3^{rd}$ Generation Partnership Project (3GPP), Mobile Competence Centre; 650, Route Des Luclioles; F-06921 Sophia-Antipolis Cedex; France, vol. RAN WG1, No. Kobe, Japan; 20070507, May 3, 2007, p. 1, 3.

Institute for INFOCOMM Research (I2R) et al.: "Transmit Antenna Selection Techniques for Uplink E-ETRA" 3GPP Draft; R1-051398, $3^{rd}$ Generation Partnership Project (3GPP). Mobile Competence Centre; 650, Route Des Lucioles; F-06921 Sophia-Antipolis Cedex; France, vol. RAN WG1, No. Seoul, Korea ; 20051107, Nov. 1, 2005 ; p. 3.

* cited by examiner

200

300

700

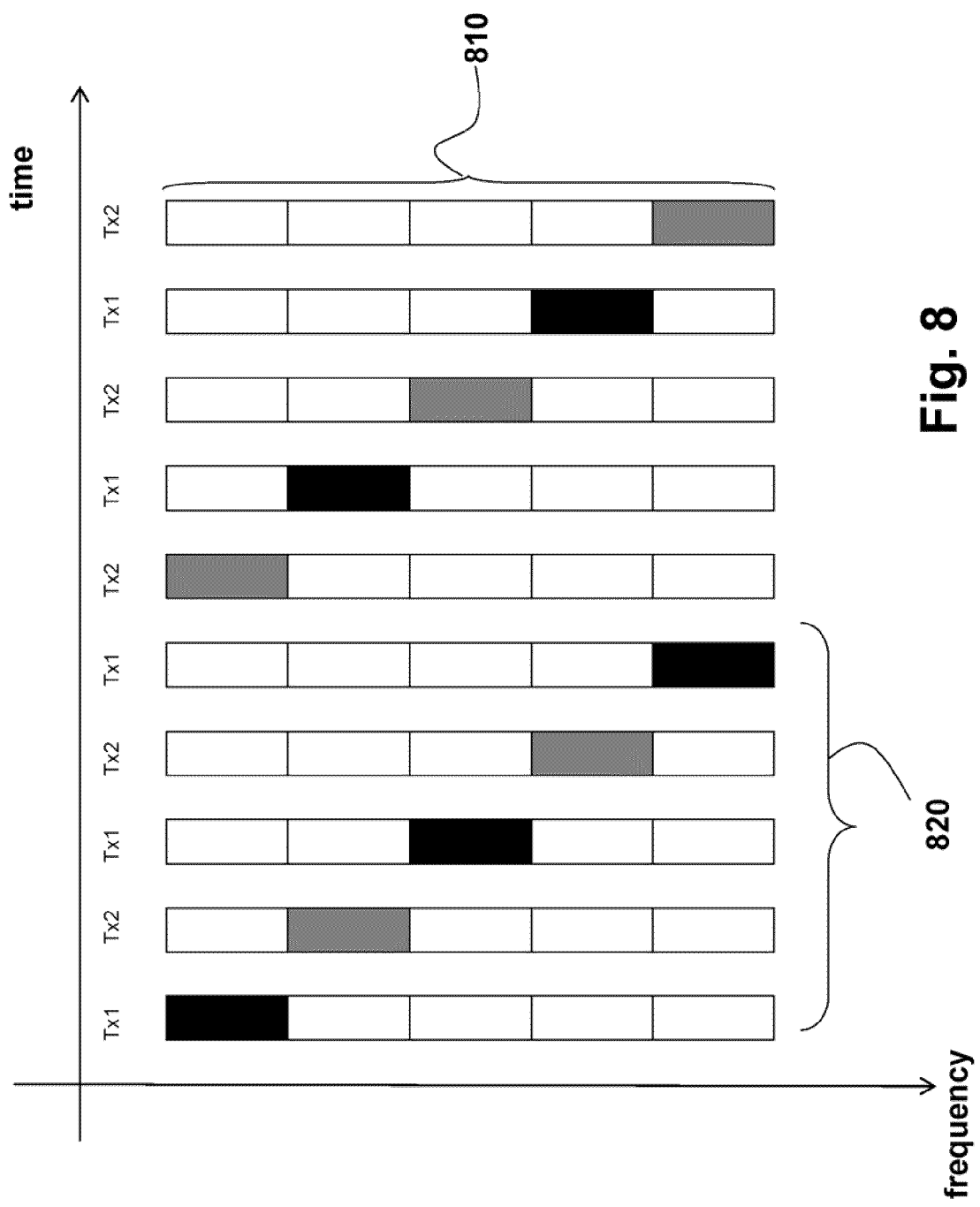

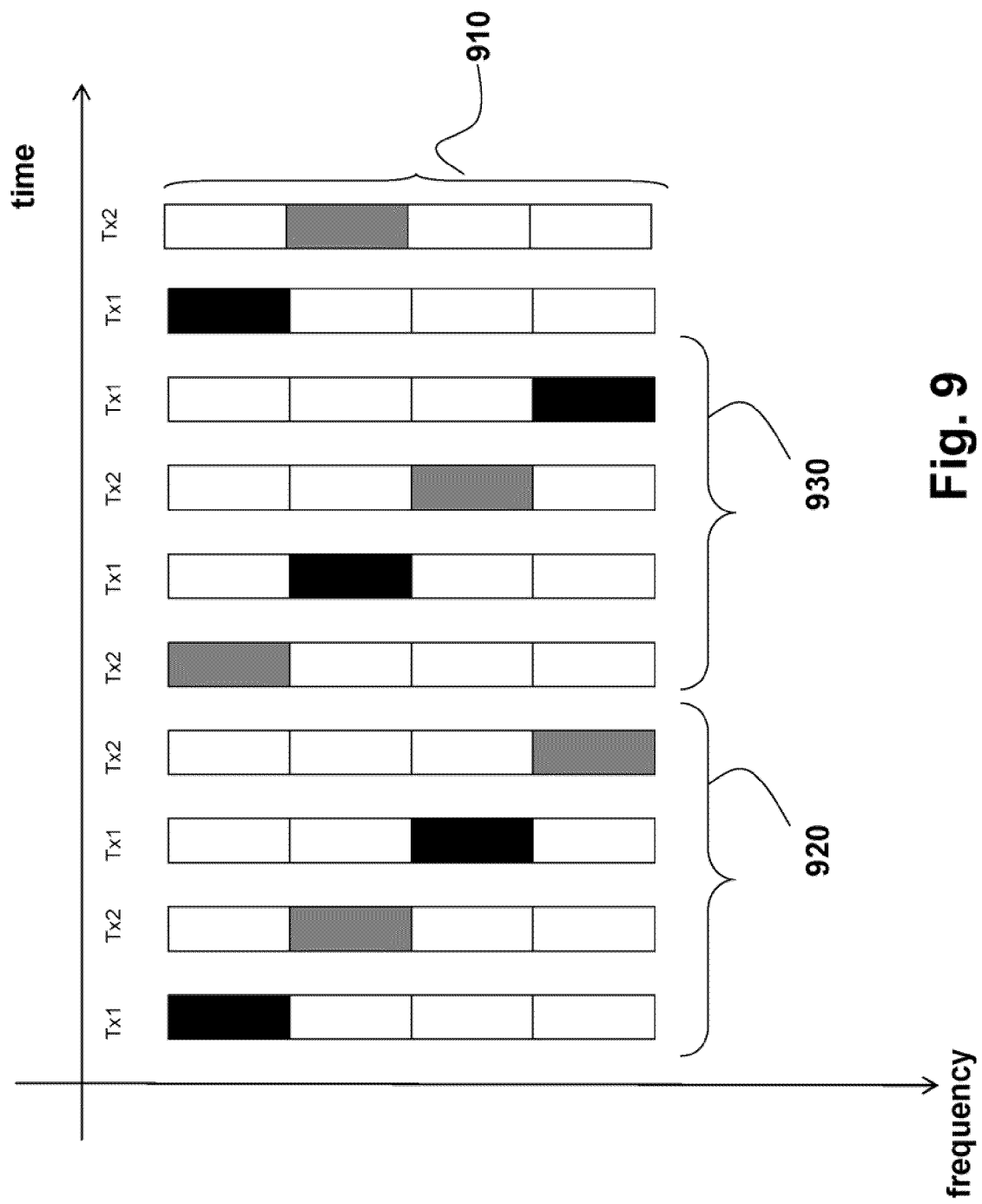

ANTENNA SELECTION WITH FREQUENCY-HOPPED SOUNDING REFERENCE SIGNALS

RELATED APPLICATIONS

The following patents and patent applications, relevant to the present application, and are incorporated herein by reference:

U.S. patent application Ser. No. 11/953,452, filed Dec. 10, 2007, entitled "Method and System for Generating Antenna Selection Signals in Wireless Networks;"

U.S. patent application Ser. No. 12/055,522, filed Mar. 26, 2008, entitled "Method for Selecting Antennas in a Wireless Networks;"

U.S. patent application Ser. No. 11/924,703, filed Oct. 26, 2007, entitled "Method for Implicit Selecting Antennas in a Wireless Networks;"

U.S. patent application Ser. No. 11/834,345, filed Aug. 6, 2007, entitled "Method for Selecting Antennas in a Wireless Networks;"

U.S. Provisional Patent Application No. 61/051,216, filed May 7, 2008, entitled "Tree-Based Frequency-Hopped Sounding Reference Signals for Transmit Antenna Selection Training;"

U.S. Provisional Patent Application No. 61/075,102, filed Jun. 24, 2008, entitled "Tree-Based Frequency-Hopped Sounding Reference Signals for Transmit Antenna Selection Training;"

U.S. Provisional Patent Application No. 61/076,743, filed Jun. 30, 2008, entitled "Tree-Based Frequency-Hopped Sounding Reference Signals for Transmit Antenna Selection Training;"

U.S. Provisional Patent Application No. 61/077,301, filed Jul. 1, 2008, entitled "Tree-Based Frequency-Hopped Sounding Reference Signals for Transmit Antenna Selection Training;" and U.S. Provisional Patent Application No. 61/077,723, filed Jul. 2, 2008, entitled "Tree-based frequency-hopped sounding reference signals for transmit antenna selection training with antenna index."

FIELD OF THE INVENTION

This invention relates generally to antenna selection in wireless communication networks, and more particularly to selecting antennas with frequency-hopped sounding reference signals.

BACKGROUND OF THE INVENTION

OFDMA and SC-OFDMA

In a wireless communication network, such as the $3^{rd}$ generation (3G) wireless cellular communication standard and the 3GPP long term evolution (LTE) standard, it is desired to concurrently support multiple services and multiple data rates for multiple users in a fixed bandwidth channel. One scheme adaptively modulates and codes symbols before transmission based on current channel estimates. Another option available in LTE, which uses orthogonal frequency division multiplexed access (OFDMA), is to exploit multi-user frequency diversity by assigning different sub-carriers or groups of sub-carriers to different users or UEs (user equipment, mobile station or transceiver). In the single carrier frequency division multiple access (SC-FDMA) uplink of LTE, in each user, the symbols are first together spread by means of a Discrete Fourier Transform (DFT) matrix and are then assigned to different sub-carriers. The network bandwidth can vary, for example, from 1.25 MHz to 20 MHz. The network bandwidth is partitioned into a number of subcarriers, e.g., 1024 subcarriers for a 10 MHz bandwidth.

The following standardization documents are applicable 3.6.211, 3rd Generation Partnership Project; Technical Specification Group Radio Access Network; Physical Channels and Modulation (Release 8), v 1.0.0 (2007-03); R1-01057, "Adaptive antenna switching for radio resource allocation in the EUTRA uplink," Mitsubishi Electric/Nortel/NTT DoCoMo, 3GPP RAN1#48, St. Louis, USA; R1-071119, "A new DM-RS transmission scheme for antenna selection in E-UTRA uplink," LGE, 3GPP RAN1#48, St. Louis, USA; and "Comparison of closed-loop antenna selection with open-loop transmit diversity (antenna switching within a transmit time interval (TT1))," Mitsubishi Electric, 3GPP RAN1#47bis, Sorrento, Italy. According to the 3GPP standard, the base station (BS) is enhanced, and is called the "Evolved NodeB" (eNodeB). We use the terms BS and eNodeB interchangeably.

Multiple Input Multiple Output (MIMO)

In order to further increase the capacity of a wireless communication network in fading channel environments, multiple-input-multiple-output (MIMO) antenna technology can be used to increase the capacity of the network without an increase in bandwidth. Because the channels for different antennas can be quite different, MIMO increases robustness to fading and also enables multiple data streams to be transmitted concurrently.

Moreover, processing the signals received in spatial multiplexing schemes or with space-time trellis codes requires transceivers where the complexity can increase exponentially as a function of the number of antenna.

Antenna Selection

Antennas are relatively simple and cheap, while RF chains are considerably more complex and expensive. Antenna selection reduces some of the complexity drawbacks associated with MIMO networks. Antenna selection reduces the hardware complexity of transmitters and receivers in the transceivers by using fewer RF chains than the number of antennas.

In antenna selection, a subset of the set of available antennas is adaptively selected by a switch, and only signals for the selected subset of antennas are connected to the available RF chains for signal processing, which can be either transmitting or receiving. As used herein, the selected subset, in all cases, means one or more of all the available antennas in the set of antennas.

Antenna Selection Signals

Pilot Tones or Reference Signals

In order to select the optimal subset of antennas, channels corresponding to available subsets of antennas need to be estimated, even though only a selected optimal subset of the antennas is eventually used for transmission.

This can be achieved by transmitting antenna selection signals, e.g., pilot tones, also called reference signals, from different antennas or antenna subsets. The different antenna subsets can transmit either the same pilot tones or use different ones. Let $N_t$ denote the number of transmit antennas, $N_r$ the number of receive antennas, and let $R_t = N_t/L_t$ and $R_r = N_r/L_r$ be integers. Then, the available transmit (receive) antenna elements can be partitioned into $R_t$ ($R_r$) disjoint subsets. The pilot repetition approach repeats, for $R_t \times R_r$ times, a training sequence that is suitable for an $L_t \times L_r$ MIMO network. During each repetition of the training sequence, the transmit RF chains are connected to different subsets of antennas. Thus, at the end of the $R_t \times R_r$ repetitions, the receiver has a complete estimate of all the channels from the various transmit antennas to the various receive antennas.

In case of transmit antenna selection in frequency division duplex (FDD) networks, in which the forward and reverse links (channels) are not identical, the transceiver feeds back the optimal set of the selected subset of antennas to the transmitter. In reciprocal time division duplex (TDD) networks, the transmitter can perform the selection independently.

For indoor local area network (LAN) applications with slowly varying channels, antenna selection can be performed using a media access (MAC) layer protocol, see IEEE 802.11n wireless LAN draft specification, I. P802.11n/D1.0, "Draft amendment to Wireless LAN media access control (MAC) and physical layer (PHY) specifications: Enhancements for higher throughput," Tech. Rep., March 2006.

Instead of extending the physical (PHY) layer preamble to include the extra training fields (repetitions) for the additional antennas, antenna selection training is done at the MAC layer by issuing commands to the physical layer to transmit and receive packets by different antenna subsets. The training information, which is a single standard training sequence for an $L_t \times L_r$ MIMO network, is embedded in the MAC header field.

SC-FDMA Structure in LTE

The basic uplink transmission scheme is described in 3GPP TR 25.814, v 1.2.2 "Physical Layer Aspects for Evolved UTRA." The scheme is a single-carrier transmission (SC-FDMA) with cyclic prefix (CP) to achieve uplink inter-user orthogonality and to enable efficient frequency-domain equalization at the receiver.

Broadband Sounding Reference Signals (SRS)

The broadband SRS helps the eNodeB to estimate the entire frequency domain response of the uplink channel from the user to the eNodeB. This helps frequency-domain scheduling, in which a subcarrier is assigned, in principle, to the user with the best uplink channel gain for that subcarrier. Therefore, the broadband SRS can occupy the entire network bandwidth, e.g., 5 MHz or 10 MHz, or a portion thereof as determined by the eNodeB. In the latter case, the broadband SRS is frequency hopped over multiple transmissions in order to cover the entire network bandwidth.

SUMMARY OF THE INVENTION

The embodiments of the invention describe a method for antenna selection in a wireless communication network. The network includes a transceiver having a set of antennas. The transceiver is configured to transmit a frequency-hopped sounding reference signal (SRS) over a subband from a subset of antennas at a time. The transceiver transmits the frequency-hopped SRS from subsets of antennas in the set of antennas alternately. In response to the transmitting, the transceiver receives information indicative of an optimal subset of antennas and transmits data from the optimal subset of antennas.

In some embodiments, we assign an index for each subset of antennas. We also use the 'selected' and 'unselected' subset of antennas as an indication to select particular subset of the antennas by the transceiver for the transmission. The index of the selected subset of antennas $a(n_{SRS})$ depends on the sub-frame number $n_{SRS}$ in which the SRS is transmitted and a number of the subset of antennas. Therefore, the index pattern above can be specified in the form a functional relationship between $a(n_{SRS})$ and $n_{SRS}$.

In one embodiment, the transceiver has two subsets of antennas, and the indexes are 0 and 1. Accordingly, the transmitting alternately leads to an index pattern of the selected subset of antennas [0, 1, 0, 1, 0, 1, 0, 1 . . . ]. In another embodiment, the transceiver has three subsets of antennas, the index pattern of the selected subset of antennas [0, 1, 2, 0, 1, 2, 0, 1, 2, 0, 1, 2 . . . ]. In various embodiments, we are switching the index of the selected subset of antennas every time after the transmitting the frequency-hopped SRS.

BRIEF DESCRIPTION OF THE DRAWINGS

FIGS. 8-9 are block diagrams of a frequency-hopped sound reference signal (SRS) transmission according to embodiments of the invention.

DETAILED DESCRIPTION OF THE PREFERRED EMBODIMENTS

LTE Network Overview

Figure 1:
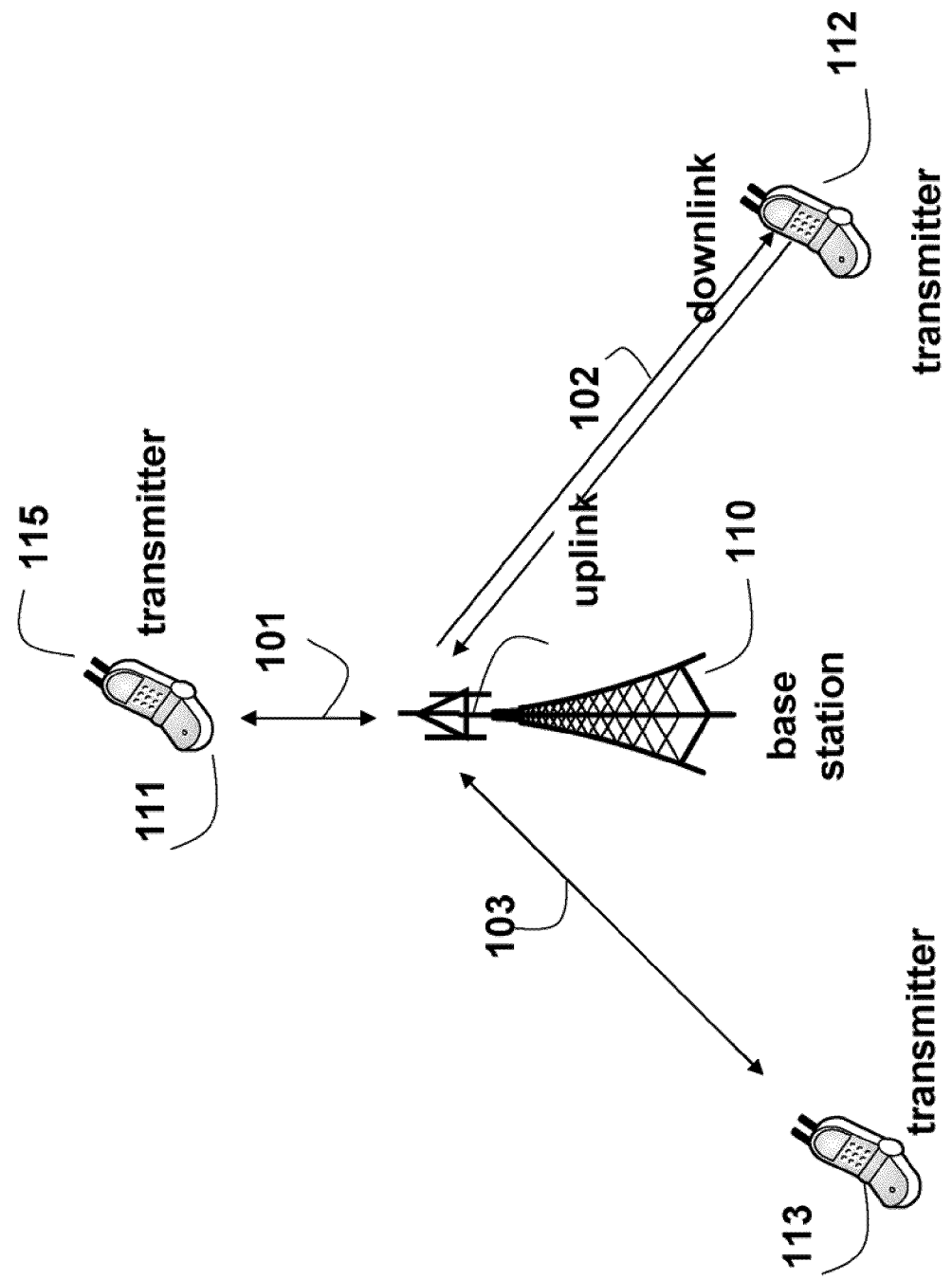
FIG. 1 is a block diagram of a wireless network according to an embodiment of the invention.

FIG. 1 shows the general structure of an LTE wireless network according to an embodiment of the invention. Multiple user equipments (UEs) or mobile transceivers 111-113 communicate with a stationary base station (BS) 110. The base station also includes transceivers.

The base station is called an evolved Node B (eNodeB) in the LTE standard. The eNodeB 110 manages and coordinates all communications with the transceivers in a cell using wireless channels or connections 101, 102, 103. Each connection can operate as a downlink (DL) from the base station to the transceiver or an uplink from the transceiver to the base station. Because the transmission power available at the base station is orders of magnitude greater than the transmission power at the transmitter, the performance on the uplink is much more critical.

To perform wireless communication, both the eNodeB and the transmitters are equipped with at least one RF chain and a number of antennas. Normally, the number of antennas and the number RF chains are equal at the eNodeB. The number of antennas at the base station can be quite large, e.g., eight. However, due to the limitation on cost, size, and power consumption, mobile transceivers usually have less RF chains than antennas 115. The number of antennas available at the transceiver is relatively small, e.g., two or four, when compared with the base station. Therefore, antenna training and selection as described is applied at the transceivers.

During operation, the transceiver switches the antennas between transmit RF chain(s) to transmit. Generally, antennas selection selects a subset of antennas from a set of available antennas at the transceiver. The antennas selection includes the training, which is used for generating and transmitting and receiving antenna selection signals. The embodiments of the invention enable the network to accommodate transceivers with different SRS bandwidths in an orthogonal manner, and use the limited resource of SRS sequences well.

LTE Frame Structure

The uplink (transceiver to eNodeB) and downlink (eNodeB to transceiver) transmissions are organized into radio frames. A radio frame is 10 ms long, and consists of 20 slots 306 of duration 0.5 ms each. Two consecutive slots constitute a subframe 301. The frame includes twenty subframes in the time domain.

Figure 2:
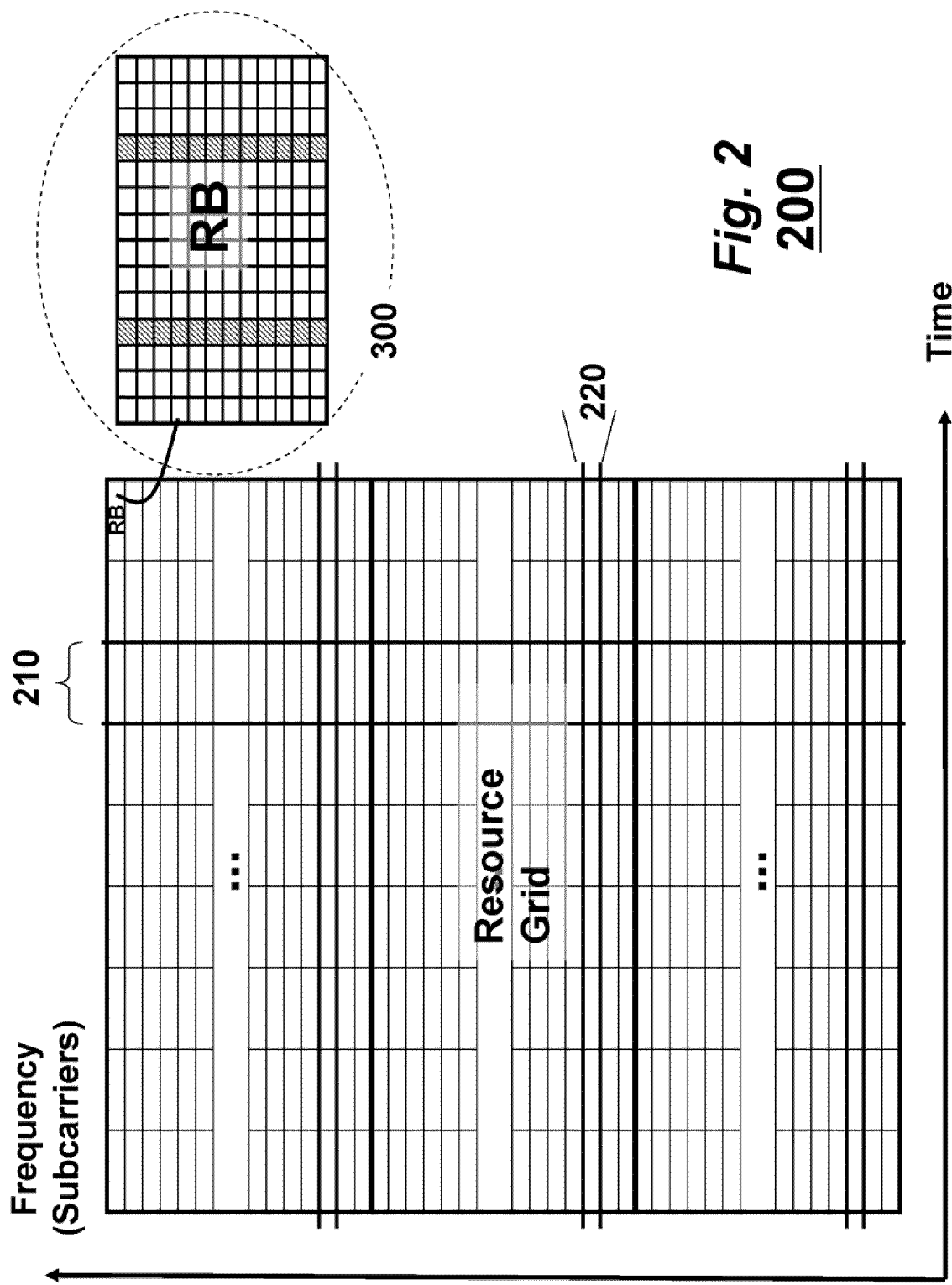
FIG. 2 is a block diagram of an uplink resource grid according to an embodiment of the invention.

FIG. 2 shows the basic structure of a SC-FDMA (single carrier frequency division multiple access) uplink resource grid 200. The horizontal axis indicates time or SC-FDMA symbols and the vertical axis indicates frequency or subcarriers. The number of subcarriers depends on the network bandwidth, which can range from 1.25 MHz to 20 MHz for example.

The uplink resource grid consists of resource elements. Each resource element is indentified by the subcarrier and the SC-FDMA symbol. The resource elements are grouped into resource blocks. A resource block (RB) consists of 12 consecutive subcarriers and six or seven consecutive SC-FDMA symbols in time. The number of SC-FDMA symbols depends on the cyclic prefix (CP) length. For a normal cyclic prefix, the number of SC-FDMA symbols equals 7 and for an extended cyclic prefix, the number of SC-FDMA symbols equals 6.)

Figure 3:
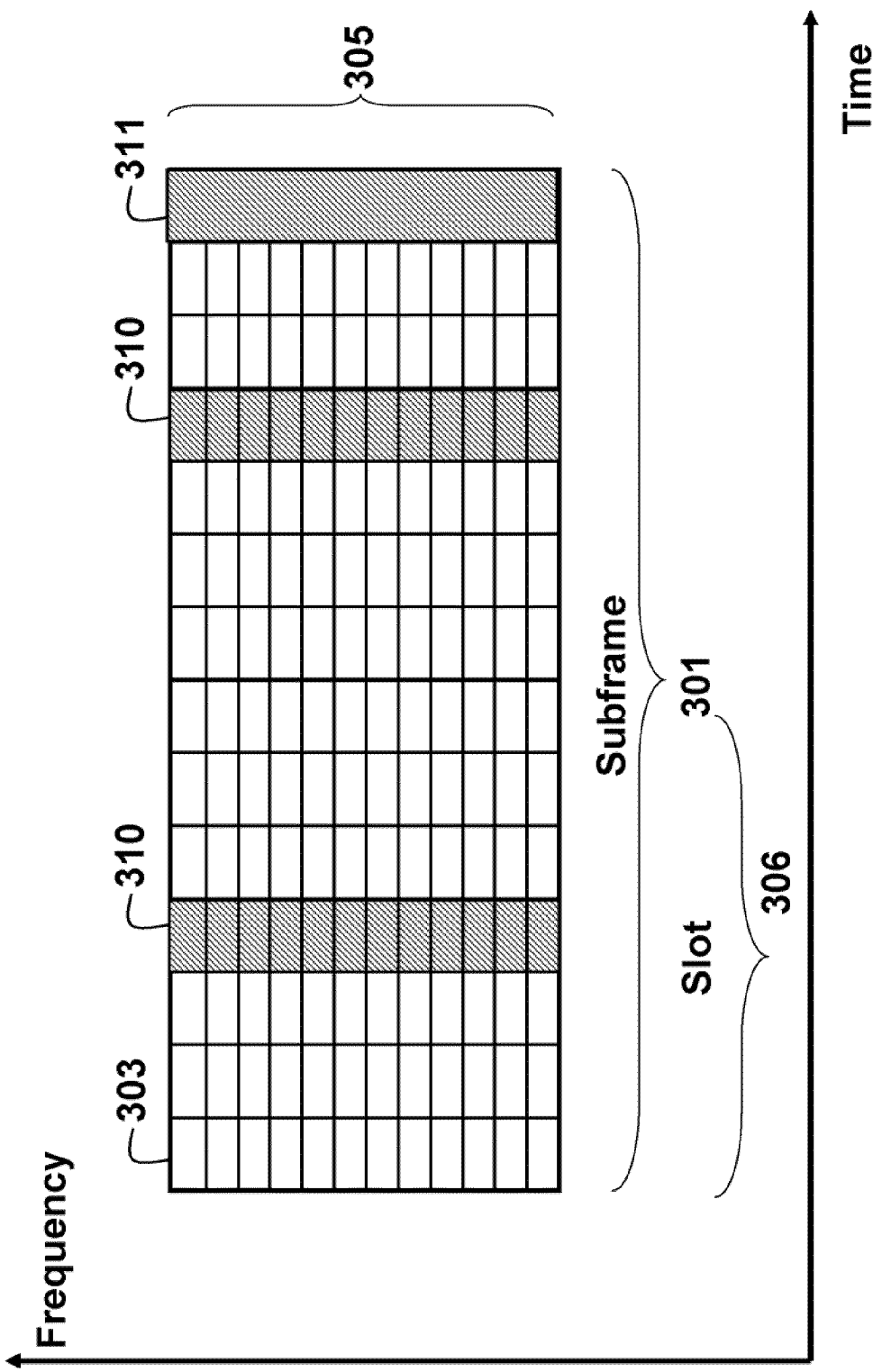
FIG. 3 is a block diagram of a resource block according to an embodiment of the invention.

Each subframe constitutes a resource block, see inset 300 and FIG. 3 for details. For the purpose of this specification and appended claims, we use the terms the subframe and the transmission time interval (TTI) interchangeably.

FIG. 3 shows a structure of a resource block (RB) 300 for the normal cyclic prefix. The vertical axis indicates frequency, and the horizontal axis time. In frequency domain, the resource block includes of a number of subcarriers. In time domain, the RB is partitioned into SC-FDMA symbols, which may include data 203 and reference signals (RS) 210. Two types of the RS are used in the uplink: sounding reference signals (SRS) 311 and demodulation reference signals (DMRS) 310.

Both the SRS and the DMRS are generated using a constant amplitude zero autocorrelation sequence (CAZAC) sequence such as a Zadoff-Chu sequence, as explained in Section 5.5.1 of TS 36.211 v 8.5.0 incorporated herein by reference. When the sequence length is not equal to the length possible for a Zadoff-Chu sequence, the sequence of desired length is generated by extending circularly a Zadoff-Chu sequence of length close to and less than the desired length or by truncating a Zadoff-Chu sequence of length close to and greater than the desired length. The DMRS is transmitted in the fourth SC-FDMA symbol for normal cyclic prefix and in the third SC-FDMA symbol for the extended cyclic prefix. The SRS, when transmitted, is typically transmitted in the last SC-FDMA symbol of the subframe except for special subframes as described in TS 36.211 v8.5.0. However, the embodiments of the invention do not depend on the SC-FDMA symbol in which the RS is transmitted.

Antennas Selection

Typically, the RS is transmitted along with or separately from user data from different subsets of antennas. Based on the RSs, the base station, estimates channels and identifies the optimal subset of antennas for data transmission.

Figure 4:
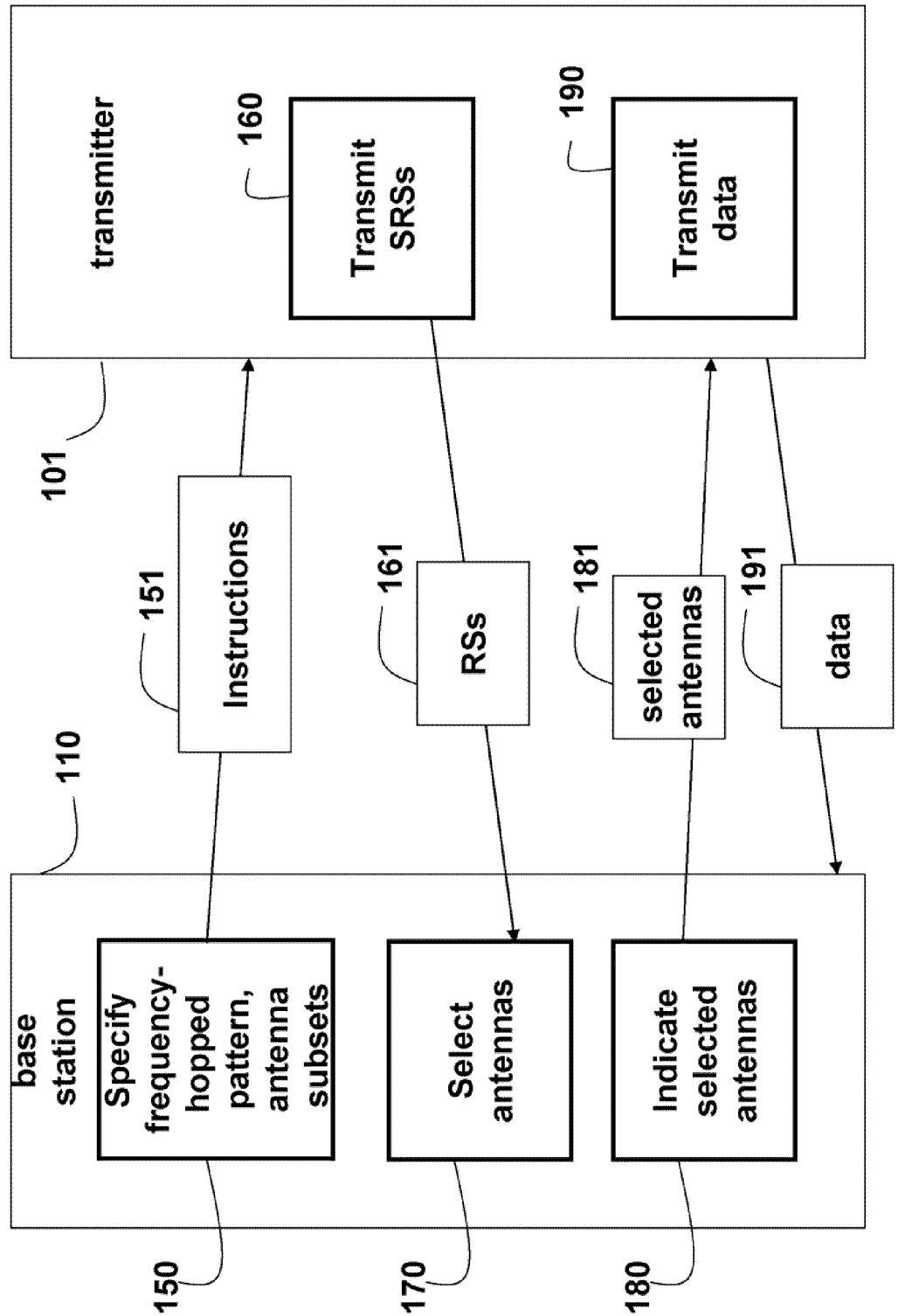
FIG. 4 is a block diagram of method for selecting antennas according to an embodiment of the invention.

FIG. 4 shows the basic method for antenna selection according to an embodiment of the invention. The base station 110 specifies instructions 151, e.g., frequency-hopped pattern and subsets of antennas to use for transmitting RSs 161. The transceiver 101 transmits the RSs 161 according to the instructions 151.

The base station selects 170 a subset of antennas 181 based on the received RSs. Then, the base station indicates 180 the selected subset of antenna 181 to the transceiver. Subsequently, the transceiver 101 transmits 190 data 191 using the selected subset of antennas 181. The transceiver can also use the same subset of antennas for receiving transmitting data.

Sounding Reference Signal (SRS)

The SRS is usually a wideband or variable bandwidth signal. The SRS enables the base station to estimate the frequency response of the entire bandwidth available for the network, or only a portion thereof. This information enables the base station to perform resource allocation such as uplink frequency-domain scheduling. According to the embodiment of the invention, the SRSs are also used for antenna selection.

Another option for LTE is to use the frequency-hopping (FH) pattern to transmit the SRS. Specifically, a hopping SRS, with a bandwidth smaller than the network bandwidth, i.e., a subband, is transmitted based on a pre-determined frequency hopping pattern. The hopped SRSs, over multiple transmissions, span a large portion of the entire bandwidth available for the network or even the entire available bandwidth. With frequency hopping, the probability that transceivers interfere with each other during training is decreased.

Figure 5:
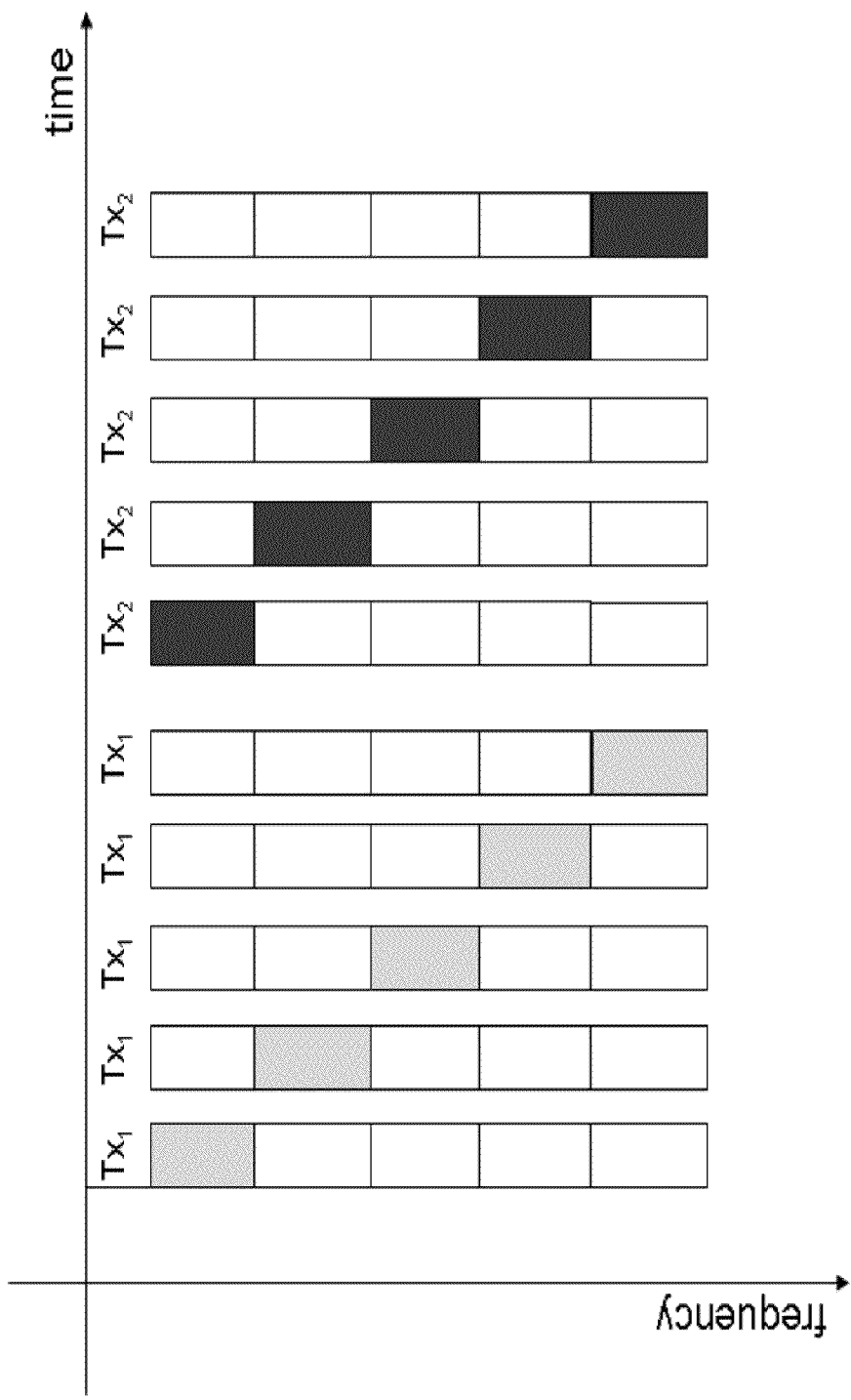
FIGS. 5-6 are block diagrams of a frequency-hopped sounding reference signal (SRS) transmission.

However, if performed incorrectly, antenna selection with a frequency-hopped variable bandwidth SRS results in limited performance improvement, particularly if the transceiver is moving rapidly. For example, as shown on FIG. 5, all the subbands of antenna $Tx_1$ are successively sounded by a frequency-hopped SRS. Thereafter, the subbands of antenna $Tx_2$ are successively sounded in a similar manner, as shown by the shaded blocks. However, the channel estimates obtained from this frequency-domain antenna selection training pattern rapidly becomes outdated.

Figure 6:
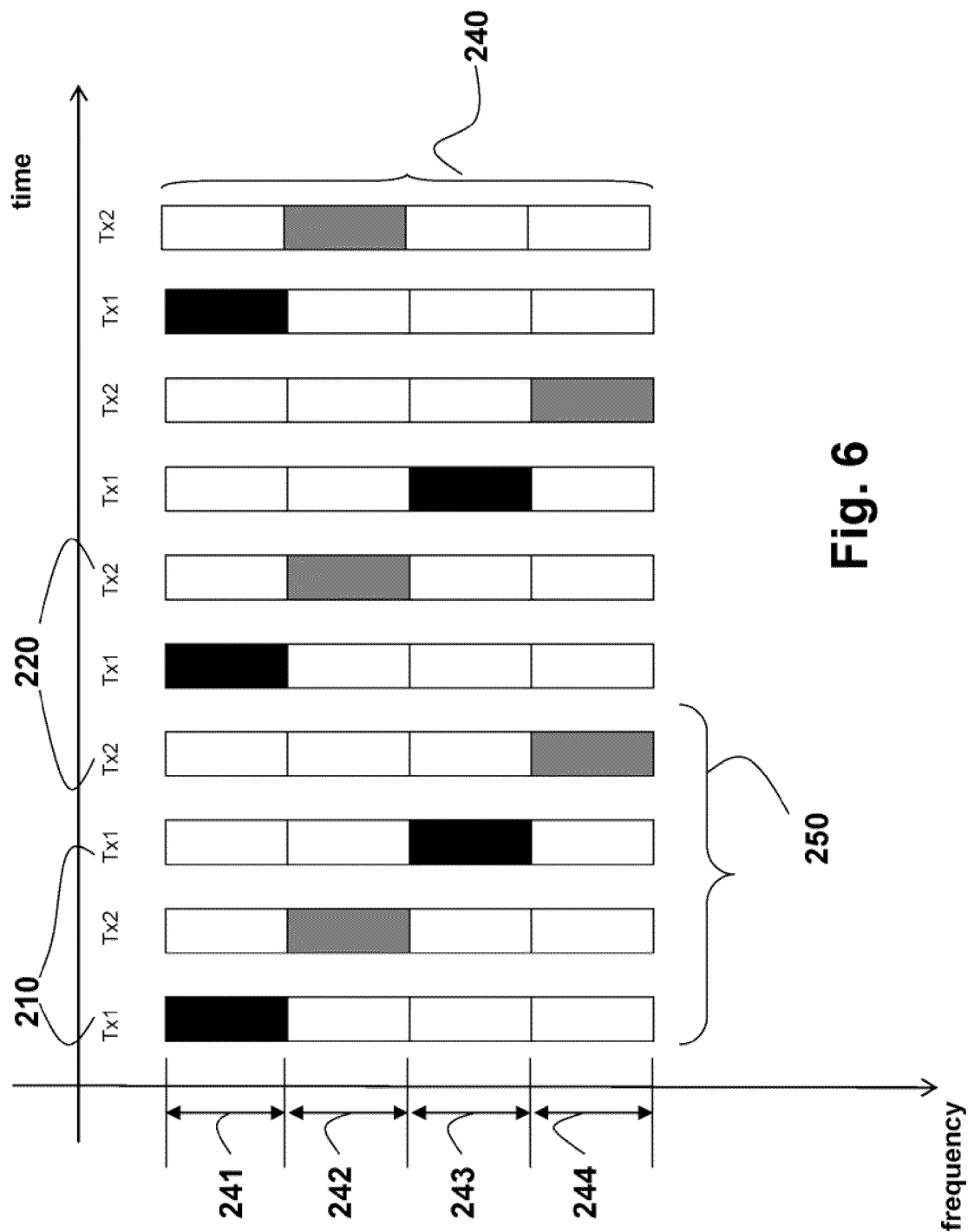

FIG. 6 shows subframes with frequency-hopped SRS transmitted from available subsets of antennas alternately. For example, the transceiver transmits the SRS alternately from two subsets of antennas, i.e., Tx1 210 and Tx2 220. The available bandwidth 240 is partitioned into four subbands 241-244, such that the SRS covers the bandwidth with four transmissions 250. Please note, that a subband can occupy one or multiple RB.

As can be seen from FIG. 6, in this transmission scenario, the SRSs for the subbands 241 and 243 are always transmitted from the subset of antennas Tx1, and the SRSs for the subbands 242 and 244 are always transmitted from the subset of antennas Tx2. Hence, the transceiver is not able to estimate the channel over entire frequency domain for each available subset of antennas.

Figure 7:
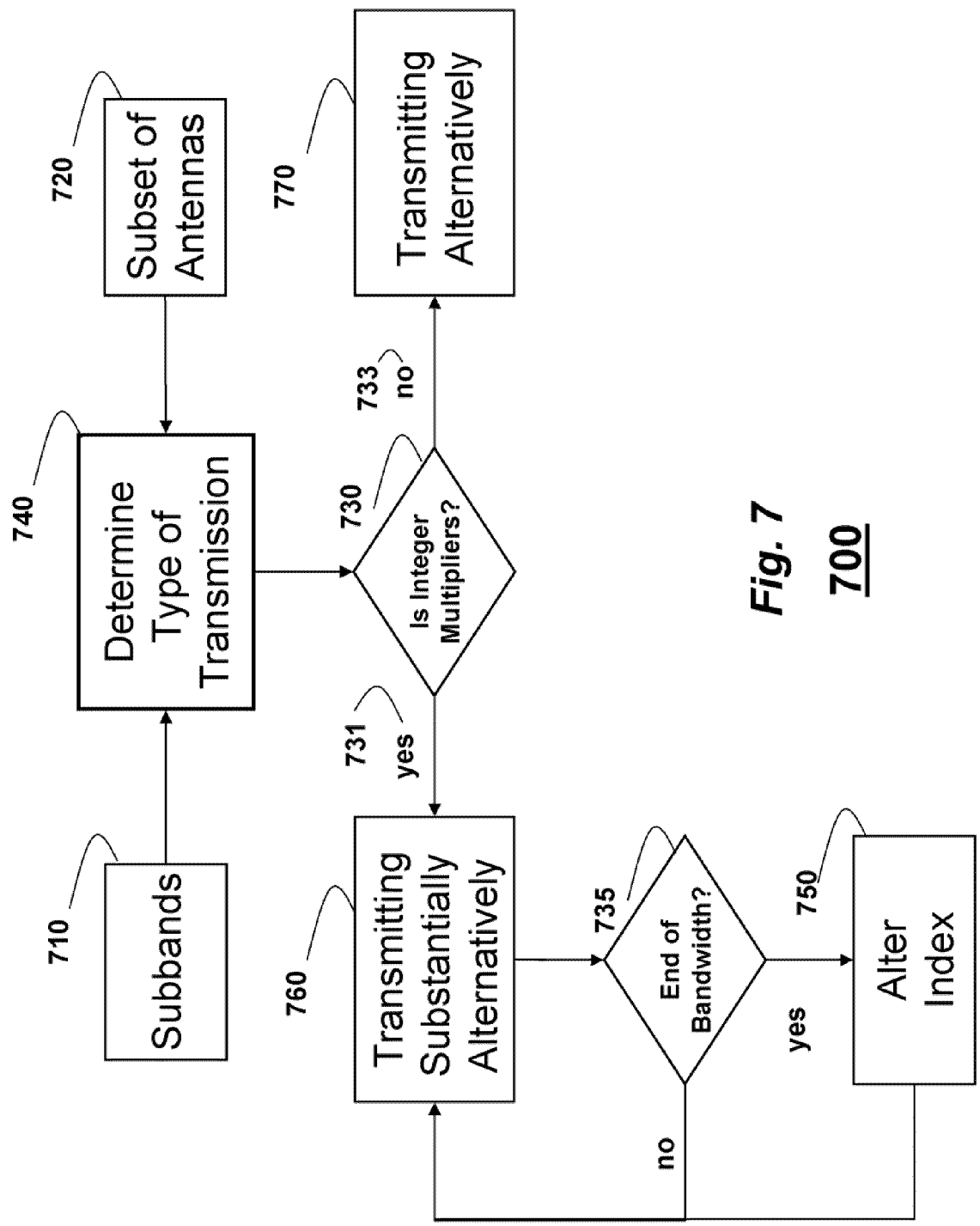
FIG. 7 is a block diagram of a method and a network for training subsets of antennas with the frequency-hopped SRS according to embodiments of the invention.

FIG. 7 shows a method and a network 700 for training for the subset of antennas with the frequency-hopped SRS transmitted from the subsets of antennas according to embodiments of the invention. Transmitting substantially alternately means, as define herein for the purpose of this specification and appended claims, that the SRSs are transmitted from each subset in the set of antennas alternately, but periodically an order of the subsets schedule for the transmission is altered.

In some embodiments, we assign an index for each subset of antennas. We also use the 'selected' and 'unselected' subset of antennas as an indication to select particular subset of the antennas by the transceiver for the transmission.

For example, if the transceiver has two subsets of antennas, the indexes will be 0 and 1. Accordingly, the transmitting alternately leads to an index pattern of the selected subset of antennas [0, 1, 0, 1, 0, 1, 0, 1 . . . ]. If the transceiver use more than two subsets of antennas for the transmission, all the subsets of antennas transmit the SRS signals alternately according indexes of the subset. For example, if the transceiver has three subsets of antennas, the index pattern of the selected subset of antennas [0, 1, 2, 0, 1, 2, 0, 1, 2, 0, 1, 2 . . . ]. Thus, we are switching the index of the selected subset of antennas every time after the transmitting the frequency-hopped SRS.

However, the transmitting substantially alternately leads to an index pattern, e.g., [0, 1, 0, 1, 1, 0, 1, 0, 0, 1 . . . ]. Please note, that for the transmitting substantially alternately method we periodically alter the index for the transmitting subset, e.g., shift or omit the indexes.

The index of the selected subset of antennas $a(n_{SRS})$ depends on the subframe number $n_{SRS}$ in which the SRS is transmitted and a number of the subset of antennas. Therefore, the index pattern above can be specified in the form a functional relationship between $a(n_{SRS})$ and $n_{SRS}$. The functional relationship depends on other parameters such as, but not limited to, the base station index and the length of the SRS sequence.

We determine 740 a type of a transmission based on a relationship between the number of subbands 710 in the bandwidth and the number of the subsets of transmit antennas 720 to be trained. As described in details below, if 730 the number of subbands is an integer multiplier of the number of transmit antennas 731, we transmit the SRSs substantially alternately 760. For example, we switch an antenna index 750 every time when the end of bandwidth is reached 735. In alternative embodiment, we switch antenna index after the end or at the beginning of the frequency-hopped pattern. If 730 the number of subbands is not integer multiplier of the number of transmit antennas 733, we transmit the SRSs alternately.

FIG. 8 shows a diagram for a method for transmitting alternately the frequency-hopped SRS. The available bandwidth of B Hz 810 is split into $N_f$ 830 subbands of bandwidth $B/N_f$ Hz each. If number of subbands is odd, e.g., $N_f$=5, and the number of the subsets of antennas is even, e.g., two, then the number of subbands is not integer multiplier of the number of transmit antennas. Thus, the transmission from the two antennas, Tx1 and Tx2, alternately results in a time-interleaved frequency hopping pattern.

FIG. 9 shows a diagram for a method for transmitting substantially alternately the frequency-hopped SRS. In this embodiment, the number of subbands, i.e., four, is integer multiplier of the number of transmitting antennas, i.e., two. Accordingly, when the transmission reaches the end of the bandwidth, e.g., a pattern of transmissions 920, we switch the indexes of the subset of the antennas. Thus, the next pattern of transmissions 930 starts from the subset of antennas Tx2, instead of the subset Tx1 as for the cycle 920.

As described above, in one embodiment, the decision of which training pattern to use is made by the base station. The training pattern is transmitted to the transceiver as part of the instruction 151. In alternative embodiment, the transceiver has knowledge about the possible training patterns, and the instruction 151 includes only identification of the training pattern to use.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

The invention claimed is:

1. A method for antenna selection (AS) in a wireless communication network, the network comprising a transceiver, wherein the transceiver has a set of antennas, and wherein the transceiver is configured to transmit a broadband frequency-hopped sounding reference signal (SRS) over a subband of a bandwidth of a frequency from a subset of antennas at a time, wherein the bandwidth of the frequency includes a plurality of subbands, comprising in the transceiver:
    determining a type of a transmission based on a relationship between a number of the subbands and a number of the antennas in the set;
    transmitting, if the number of subbands is not integer multiplier of the number of the antennas, the frequency-hopped broadband SRSs over the plurality of subbands from subsets of antennas in the set of antennas alternately, such that any two subsequently transmitted broadband SRSs are transmitted from different subsets of antennas;
    receiving, in response to the transmitting, information indicative of an optimal subset of antennas; and
    transmitting data from the optimal subset of antennas.

2. The method of claim 1, further comprising:
    receiving an instruction regarding a type of the transmission.

3. The method of claim 1, further comprising:
    receiving an instruction regarding a training patter 4. The method of claim 1, further comprising:
    acquiring a frequency-hopped pattern.

5. The method of claim 4, wherein the transmitting the frequency-hopped SRS further comprising:
    transmitting the frequency-hopped SRS according to the frequency-hopped pattern.

6. The method of claim 5, wherein any two SRSs transmitted over any two subsequent subbands are transmitted from different subsets of antennas.

7. The method of claim 6, wherein the any two subsequent subbands are determined by the frequency-hopped pattern.

8. The method of claim 1, further comprising:
    switching an index of a selected subset of antennas every time after the transmitting the frequency-hopped SRS.

9. The method of claim 1, wherein the transceiver includes only two subsets of antennas having indexes 0 and 1 respectfully, and wherein an index pattern of a selected subset of antennas [0, 1, 0, 1, 0, 1, 0, 1 . . . ].

10. The method of claim 1, wherein the transceiver includes three subsets of antennas having indexes 0, 1 and 2 respectfully, and wherein an index pattern of a selected subset of antennas [0, 1, 2, 0, 1, 2, 0, 1, 2, 0, 1, 2 . . . ].

11. A wireless communication network, the network comprising:
    a transceiver, wherein the transceiver includes a set of antennas, and wherein the transceiver is configured to transmit a frequency-hopped sounding reference signal (SRS) over a subband from a subset of antennas at a time alternately when a type of a transmission determined based on a relationship between a number of the subbands and a number of the antennas in the set indicates that the number of subbands is not integer multiplier of the number of the antennas, wherein the transceiver further comprises:
    means for switching an index of a selected subset of antennas every time after the transmitting the frequency-hopped SRS, and wherein the transceiver includes a first subset of antennas and a second subset of antennas, wherein the transceiver is configured to transmit any two SRSs transmitted over any two subsequent subbands from different subsets of antennas.

12. A transceiver configured for an antenna selection with a frequency-hopped sounding reference signal (SRS), wherein each SRS is transmitted over a subband of a frequency at a time, wherein a bandwidth of the frequency includes multiple subbands, comprising:
  a set of antennas;
  means for determining a type of a transmission based on a relationship between a number of the subbands and a number of the antennas in the set;
  means for transmitting the frequency-hopped SRS from a selected subset of antennas over a selected subband of the frequency;
  means for changing an index of the selected subset of antennas every time after the transmitting the frequency-hopped SRS, if the number of subbands is not integer multiplier of the number of the antennas;
  means for selecting from the bandwidth of the frequency, a subsequent subband as the selected subband every time after the transmitting the frequency-hopped SRS;
  means for receiving, in response to the transmitting, information indicative of an optimal subset of antennas; and
  means for transmitting data from the optimal subset of antennas.

13. A method for antenna selection (AS) in a wireless communication network, the network comprising a transceiver, wherein the transceiver has a set of antennas including a first subset of antennas and a second subset of antennas, and wherein the transceiver is configured to transmit a frequency-hopped sounding reference signal (SRS) over a subband of a bandwidth of a frequency from a subset of antennas at a time, wherein the bandwidth of the frequency includes a plurality of subbands, comprising in the transceiver:
  determining a type of a transmission based on a relationship between a number of the subbands and a number of the antennas in the set;
  transmitting the frequency-hopped SRS over the plurality of subbands from subsets of antennas in the set of antennas alternately, if the number of subbands is not integer multiplier of the number of the antennas, wherein the transmitting comprises:
    transmitting the SRS from the first subset of antennas; and
    transmitting the SRS from the second subset of antennas for every transmission immediately following the transmitting the SRS from the first subset of antennas;
  receiving, in response to the transmitting, information indicative of an optimal subset of antennas; and
  transmitting data from the optimal subset of antennas.

\* \* \* \* \*